US011204720B2

(12) United States Patent
Dhuse et al.

(10) Patent No.: US 11,204,720 B2
(45) Date of Patent: Dec. 21, 2021

(54) DATA RETENTION IN ZONE STORAGE

(71) Applicant: INTERNATIONAL BUSINESS MACHINES CORPORATION, Armonk, NY (US)

(72) Inventors: Gregory R. Dhuse, Chicago, IL (US); Ilya Volvovski, Chicago, IL (US); Praveen Viraraghavan, Chicago, IL (US); Jordan Harrison Williams, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/828,486

(22) Filed: Mar. 24, 2020

(65) Prior Publication Data

US 2021/0303200 A1   Sep. 30, 2021

(51) Int. Cl.
*G06F 3/06* (2006.01)
(52) U.S. Cl.
CPC .......... *G06F 3/0659* (2013.01); *G06F 3/0604* (2013.01); *G06F 3/067* (2013.01); *G06F 3/0653* (2013.01)
(58) Field of Classification Search
None
See application file for complete search history.

(56) References Cited

U.S. PATENT DOCUMENTS

| | | | | |
|---|---|---|---|---|
| 2010/0217888 A1* | 8/2010 | Ukita | ......... | H04N 21/6379 709/234 |
| 2013/0275391 A1* | 10/2013 | Batwara | ......... | G06F 16/125 707/689 |
| 2017/0192688 A1 | 7/2017 | Dhuse et al. | | |
| 2018/0018285 A9* | 1/2018 | Volvovski | ......... | H04L 67/1097 |
| 2018/0046544 A1 | 2/2018 | Resch et al. | | |
| 2018/0246670 A1* | 8/2018 | Baptist | ......... | G06F 3/0659 |

OTHER PUBLICATIONS

Anonymous, "Delaying Deletion and Restoration of Slice Data when a Delete Intention is Provided", IP.com, Oct. 6, 2016, 2 pages.
Anonymous, "Method and System for Implementing Memory Based Compaction on Logged Based Structure for Zone Slice Storage", IP.com, Sep. 19, 2018, 3 pages.
Mell et al., "The NIST Definition of Cloud Computing", NIST, Special Publication 800-145, Sep. 2011, 7 pages.

* cited by examiner

*Primary Examiner* — Idriss N Alrobaye
*Assistant Examiner* — Dayton Lewis-Taylor
(74) *Attorney, Agent, or Firm* — Anthony England; Andrew D. Wright; Roberts Calderon Safran & Cole. P.C.

(57) ABSTRACT

Methods and systems for data retention in zone storage are disclosed. A method includes: ingesting, by a computing device, a plurality of data objects into a dispersed storage network (DSN); writing, by the computing device, the plurality of data objects to at least one zone on a storage medium in the DSN; determining, by the computing device, that a compaction threshold corresponding to the at least one zone on the storage medium in the DSN is met; determining, by the computing device, that a retention window corresponding to the at least one zone on the storage medium in the DSN has expired; and in response to determining that the retention window has expired, the computing device compacting the at least one zone on the storage medium in the DSN.

17 Claims, 7 Drawing Sheets

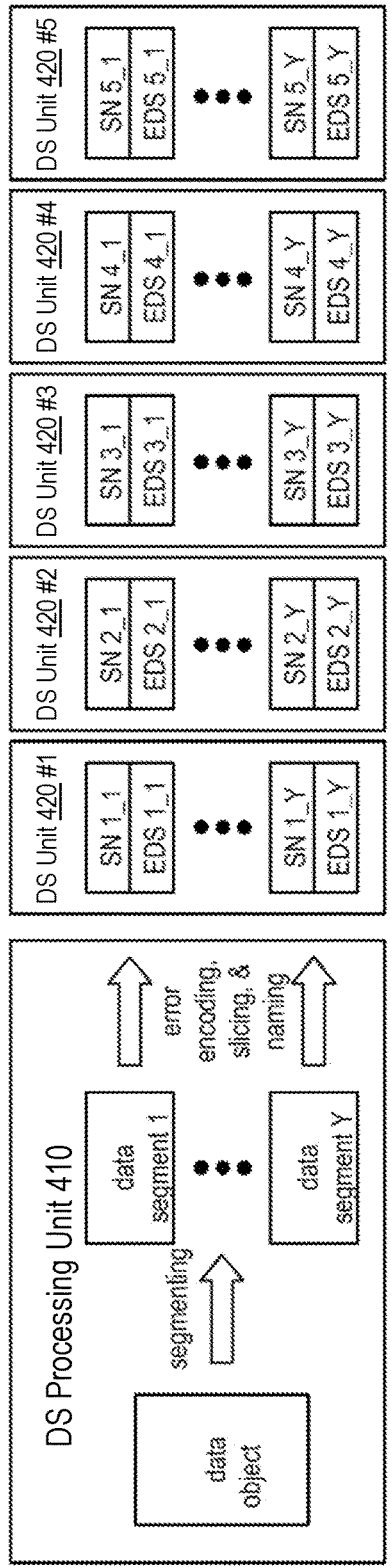
FIG. 5
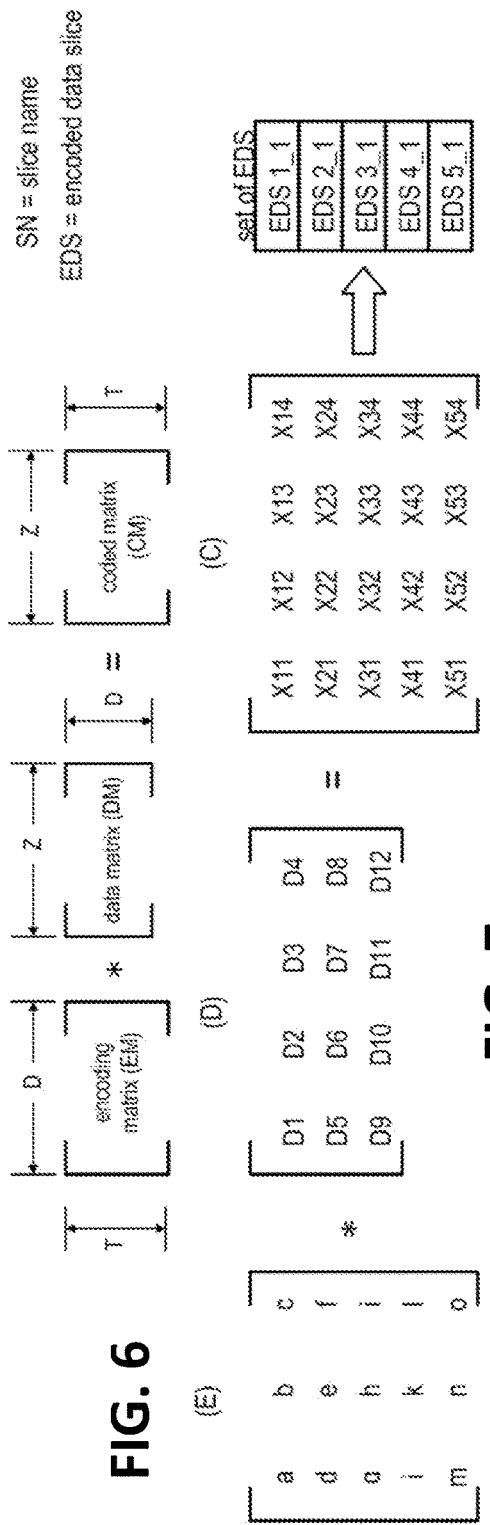
FIG. 6
FIG. 7
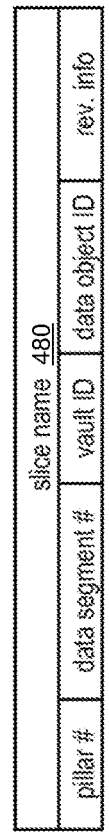
| pillar # | data segment # | slice name 480 vault ID | data object ID | rev. info |
FIG. 8

DATA RETENTION IN ZONE STORAGE

BACKGROUND

Aspects of the present invention generally relate to computing devices and, more particularly, to methods and systems for data retention in zone storage.

Computing devices communicate data, process data, and/or store data. Such computing devices range from wireless smart phones, laptops, tablets, personal computers (PCs), work stations, and video game devices, to data centers that support millions of web searches, stock trades, or online purchases every day. Computing devices typically include a central processing unit (CPU), a memory system, user input/output interfaces, peripheral device interfaces, and an interconnecting bus structure.

A computing device may effectively extend its CPU by using cloud computing to perform one or more computing functions (e.g., a service, an application, an algorithm, an arithmetic logic function, etc.) on behalf of the computing device. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Further, for large services, applications, and/or functions, cloud computing may be performed by multiple cloud computing resources in a distributed manner to improve the response time for completion of the service, application, and/or function. For example, Hadoop® (a registered trademark of The Apache Software Foundation) is an open source software framework that supports distributed applications enabling application execution by thousands of computers. Network storage is a computing capability that is typically offered by cloud computing providers. In particular, a user of cloud computing services may store and retrieve data on cloud infrastructure maintained by a cloud computing provider, such as a dispersed storage (DS) or dispersed storage network (DSN) system. A computer may use cloud storage as part of its memory system. Cloud storage enables a user, via a computer, to store files, applications, etc., on an Internet storage system. The Internet storage system may include a redundant array of independent disks (RAID) system and/or a dispersed storage system (dispersed storage network memory) that uses an error correction scheme to encode data for storage.

SUMMARY

In a first aspect of the invention, there is a method that includes: ingesting, by a computing device, a plurality of data objects into a dispersed storage network (DSN); writing, by the computing device, the plurality of data objects to at least one zone on a storage medium in the DSN; determining, by the computing device, that a compaction threshold corresponding to the at least one zone on the storage medium in the DSN is met; determining, by the computing device, that a retention window corresponding to the at least one zone on the storage medium in the DSN has expired; and in response to determining that the retention window has expired, the computing device compacting the at least one zone on the storage medium in the DSN.

In another aspect of the invention, there is a computer program product that includes one or more computer readable storage media, and program instructions collectively stored on the one or more computer readable storage media. The program instructions include: program instructions to ingest a plurality of data objects into a dispersed storage network (DSN); program instructions to write the plurality of data objects to at least one zone on a storage medium in the DSN; program instructions to close the at least one zone on the storage medium in the DSN; program instructions to determine that a retention window corresponding to the at least one zone on the storage medium in the DSN has expired; and program instructions to, in response to determining that the retention window has expired, compact the at least one zone on the storage medium in the DSN.

In another aspect of the invention, there is a system that includes: a processor, a computer readable memory, one or more computer readable storage media, and program instructions collectively stored on the one or more computer readable storage media, the program instructions executable to: ingest a plurality of data objects into a dispersed storage network (DSN); write the plurality of data objects to at least one zone on a storage medium in the DSN; determine that a compaction threshold corresponding to the at least one zone on the storage medium in the DSN is met; determine that a retention window corresponding to the at least one zone on the storage medium in the DSN has expired; and compact the at least one zone on the storage medium in the DSN.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 is a schematic block diagram of an example of dispersed storage error encoding of data in accordance with aspects of the present invention.

FIG. 6 is a schematic block diagram of a generic example of an error encoding function in accordance with aspects of the present invention.

FIG. 7 is a schematic block diagram of a specific example of an error encoding function in accordance with aspects of the present invention.

FIG. 8 is a schematic block diagram of an example of a slice name of an encoded data slice (EDS) in accordance with aspects of the present invention.

DETAILED DESCRIPTION

Figure 1:
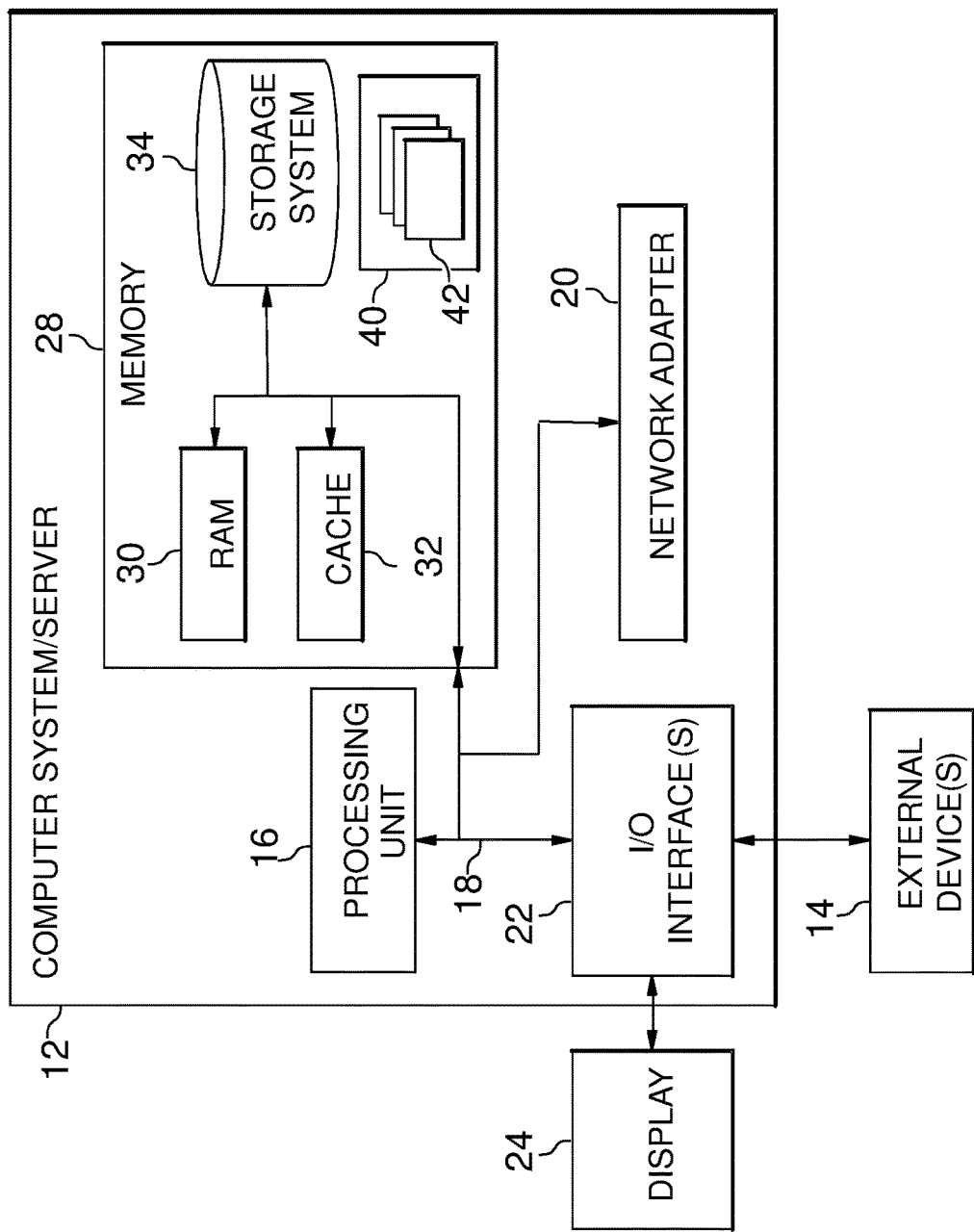
FIG. 1 depicts a cloud computing node according to an embodiment of the present invention.

Aspects of the present invention generally relate to computing devices and, more particularly, to methods and systems for data retention in zone storage. As described herein, aspects of the invention include a method and system that provide for the retention of deleted data in a zone for a given retention window. Additionally, aspects of the invention include a method and system that, after the retention window has expired, permanently delete the data and reclaim the space by performing compaction.

Postponing the physical removal of overwritten or deleted data may be advantageous in a storage system. Zone slice storage (ZSS) is a log-based data structure that does not immediately physically remove (delete) data that is old or obsolete but instead marks it as unused by removing references to its location or metadata. Space allocated for old or obsolete data is subject to future reclamation via a compaction process. In particular, in ZSS, data is written in sequential order, and compaction is used to free space that is otherwise unusable. The compaction process includes reading the entire zone and moving live data to a new location (zone), thus reclaiming a partially populated zone as free space. In particular, in the compaction process, the data for a given zone on the storage medium is read, all gaps caused by object deletes or new revisions are removed, and the compacted data is rewritten to a new area of the storage medium with 100% utilization since all of the data is relevant.

In ZSS, objects have intrinsic temporal locality, and therefore ZSS is able to retain data based on time. In particular, zones are sequentially written in a particular timeframe, and the time of write for two zones generally does not overlap.

Conventional systems may compact a zone as soon as the zone is fully written and/or compaction criteria are satisfied. However, by performing compaction as soon as a zone is fully written and/or compaction criteria are satisfied, clients may be unable to read at a specified time in the past using read timestamps, and error recovery may not be possible.

Embodiments address problems with clients being unable to read at a specified time in the past and problems with error recovery due to compaction of zones. Accordingly, embodiments improve the functioning of a computer by providing methods and systems for data retention in zone storage. In particular, embodiments improve the functioning of a computer by providing a method and system that provide for the retention of deleted data in a zone for a given retention window. Additionally, embodiments improve the functioning of a computer by providing a method and system that, after the retention window has expired, permanently delete the data and reclaim the space. Additionally, implementations of the invention use techniques that are, by definition, rooted in computer technology (e.g., DSNs, DS processing units, DS units, DS managers, and cloud computing).

In embodiments, data compaction for a zone is postponed until the expiration of a predefined period of time called a retention window. During this time, the data stored in the zone remains available to clients reading at a time in the past using read timestamps and remains available for recovery in case of errors or other circumstances that could lead to loss of data. In embodiments, after the retention window has expired, the system safely deletes non-live data. Embodiments require minimal amounts of processing and input/output overhead to maintain access to deleted data during the retention window.

In embodiments, the retention window increases space utilization on a storage medium and decreases the effective storage capacity of the storage medium. Embodiments use the system ingest rate (i.e., the amount of data stored in a particular unit of time) to calculate how much extra data would be accumulated on a system due to maintenance of the retention window (e.g., by multiplying the system ingest rate by the retention window) and/or determine the length of the retention window based on a specified amount of storage space (e.g., by dividing the specified amount of storage space by the system ingest rate). In embodiments, even though extra space is used, normal operations are not impacted in a system that is not fully utilizing or nearly fully utilizing the available storage space. In embodiments, when used with timestamp reads, the retention window defines the duration where a client can perform multiple point-in-time reads with the guarantee that the data exist and all the reads can be serviced without retries. In this way, embodiments enable large consistent reads (e.g., reads that take an amount of time up to the length of the retention window) that would otherwise be impractical due to read-write conflicts causing restarts.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
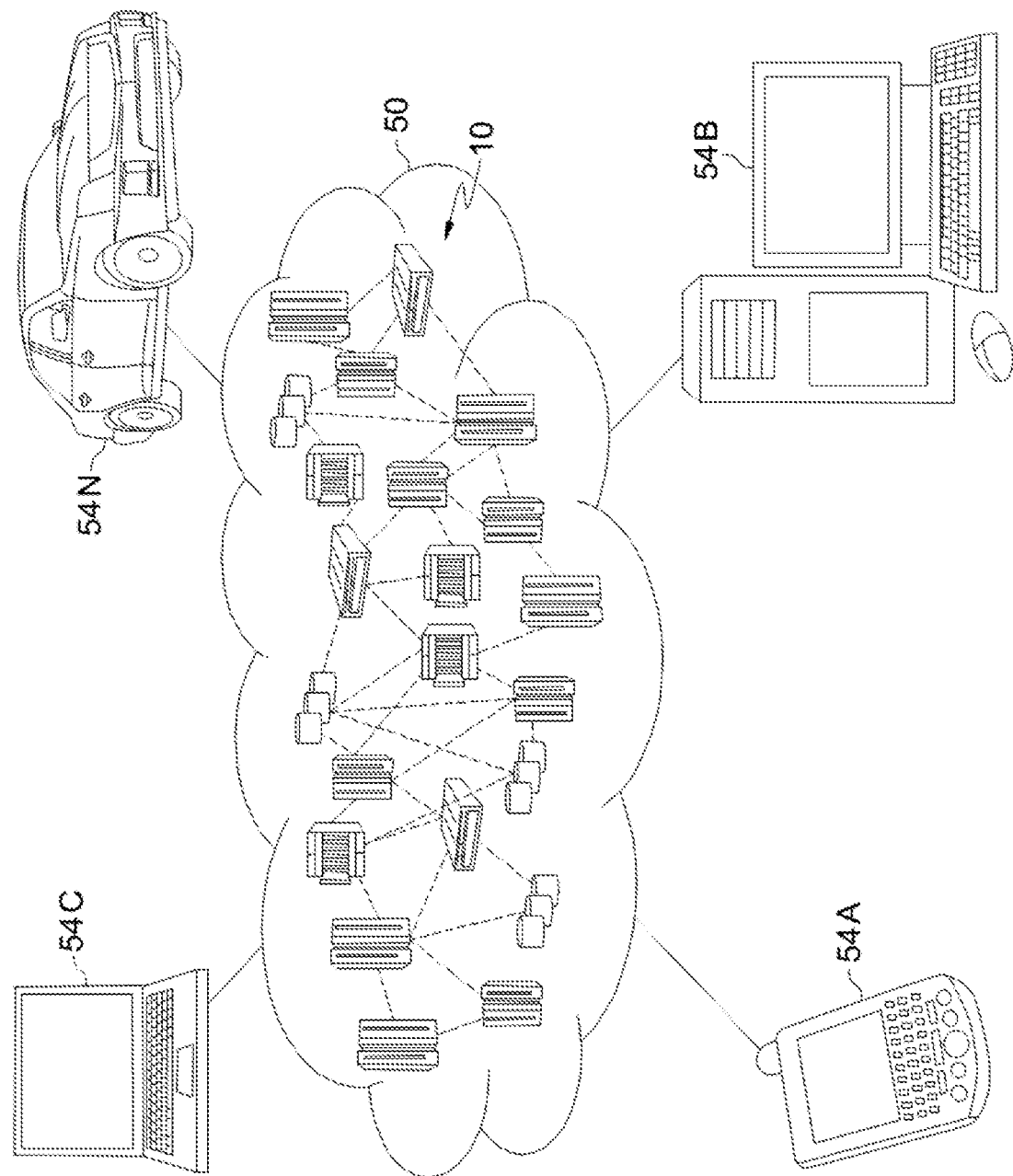
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
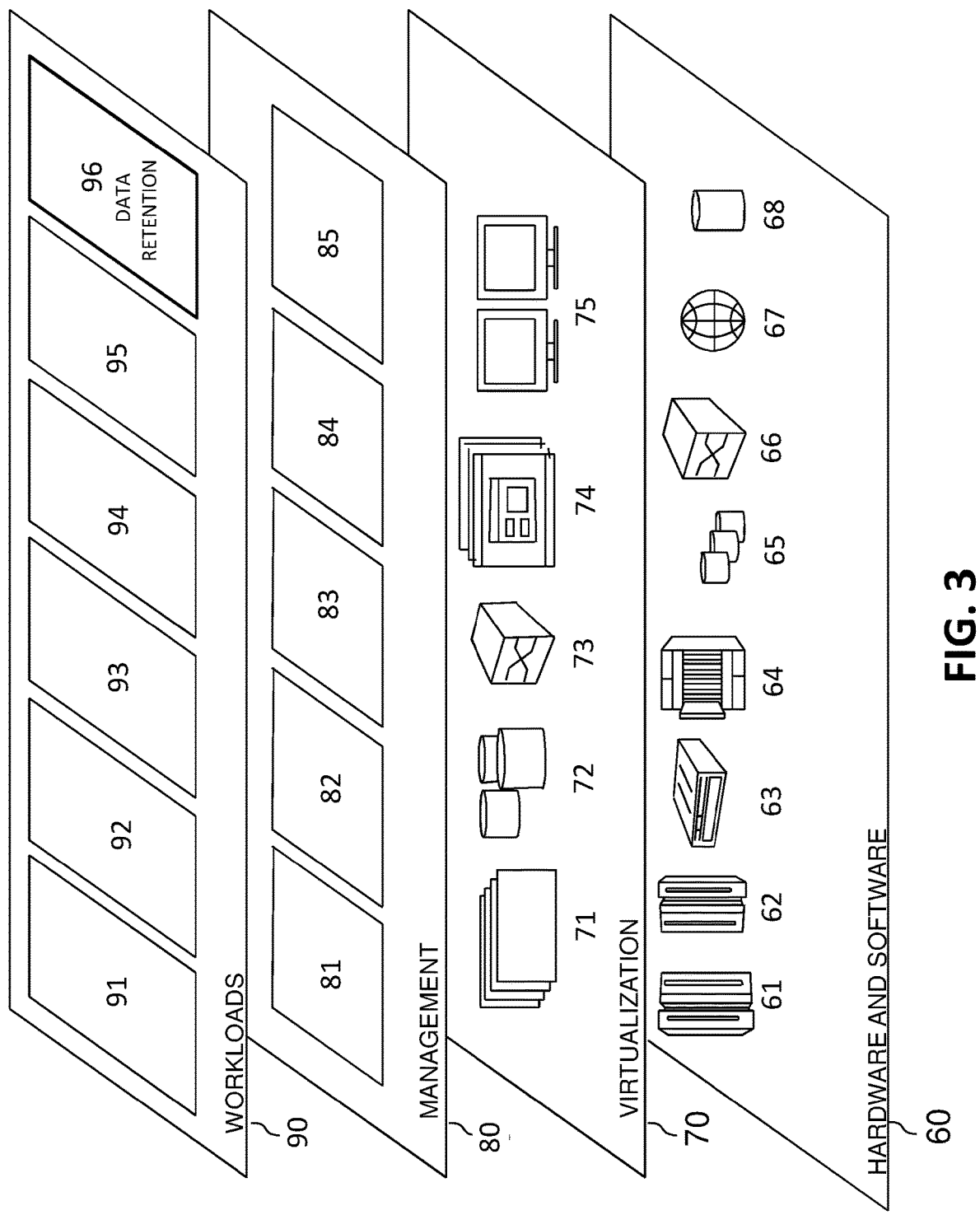
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data retention 96.

Implementations of the invention may include a computer system/server 12 of FIG. 1 in which one or more of the program modules 42 are configured to perform (or cause the computer system/server 12 to perform) one of more functions of the data retention 96 of FIG. 3. For example, the one or more of the program modules 42 may be configured to enable the retention of deleted data in a zone for a given retention window, and, after the retention window has expired, permanently delete the data and reclaim the space. Other functionalities of the program modules 42 are described further herein such that the program modules 42 are not limited to the functions described above. Moreover, it is noted that some of the program modules 42 can be implemented within the infrastructure shown in FIGS. 1-4. For example, the program modules 42 may be representative of a DS processing unit program module 415 and a DS unit program module 425 as shown in FIG. 4.

Figure 4:
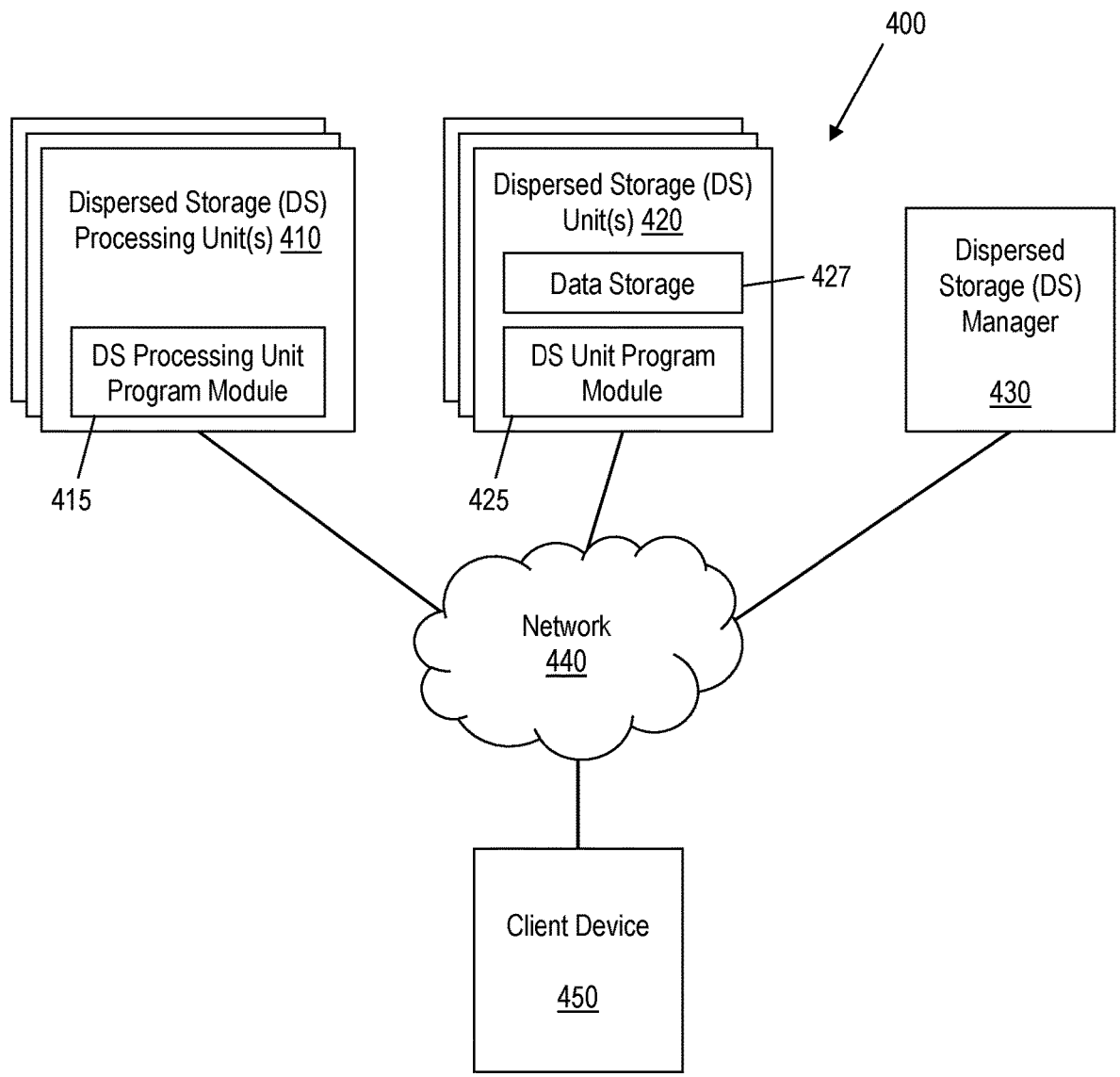
FIG. 4 shows a dispersed storage network (DSN) in accordance with aspects of the invention.

FIG. 4 shows a dispersed storage network 400 (referred to as DSN or dsNet) in accordance with aspects of the invention. In embodiments, the DSN 400 comprises plural dispersed storage processing units 410 (DS processing units), plural dispersed storage units 420 (DS units), and at least one dispersed storage manager 430 (DS manager). The DS processing units 410, the DS units 420, and the DS manager 430 all communicate via a network 440, which comprises one or more computer networks such as a LAN, WAN, and the Internet. In a cloud implementation, the network 440 is a cloud computing environment 50 of FIG. 2, and each of the DS processing units 410, the DS units 420, and the DS manager 430 are nodes 10 in the cloud computing environment 50.

In accordance with aspects of the invention, the DSN 400 stores data using object storage technology, which uses Information Dispersal Algorithms (IDAs) to separate a data object into slices that are distributed to plural ones of the DS units 420. As used herein, a slice is a dispersed piece of encoded data. Slices are created from an original data object and can be used to recreate the original data object. In particular, the DSN 400 creates slices using a combination of erasure coding, encryption, and dispersal algorithms. The erasure coding generates "extra" slices for each data object, such that the data object can be recreated from a subset (less than all of) the total number of slices that are stored for this data object. By dividing a data object into slices and storing the slices at plural different DS units 420, the DSN 400 ensures that no single one of the DS units 420 has all the slices that are necessary to recreate the data object. Moreover, by creating extra slices for each data object, the DSN 400 can tolerate multiple failures without losing the ability to recreate the original data object, e.g., from the available slices.

According to aspects of the invention, the DS manager 430 provides a management interface that is used for system administrative tasks, such as system configuration, storage provisioning, and monitoring the health and performance of the system. The DS manager 430 may comprise a physical device (e.g., a computer device such as computer system/ server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

According to aspects of the invention, the DS processing units 410 are configured to encrypt and encode data during a write operation, to manage the dispersal of slices of data during a write operation, and to decode and decrypt data during a read operation. In one example, during a write operation, one or more of the DS processing units 410 are configured to generate data slices for storage by performing a dispersed storage error encoding function on a set of data segments for storage, where the encoded data slices of a data segment are transmitted to an information dispersal algorithm (IDA) width threshold number of DS units 420. In this example, during a read operation, one or more of the DS processing units 410 are configured to recover a data segment by retrieving at least an IDA decode threshold number of encoded data slices from at least a corresponding IDA decode threshold number of DS units 420, and by performing a dispersed storage error decoding function on the received encoded data slices.

In embodiments, the DS processing units 410 are stateless components that present a storage interface to a client application and that transform data objects into slices using an IDA. Each DS processing unit 410 may comprise a physical device (e.g., a computer device such as a computer system/server 12 of FIG. 1), a virtual machine (VM), or a container (e.g., a Docker container).

In embodiments, each DS processing unit 410 comprises a DS processing unit program module 415 that is configured to perform processes of the DS processing unit 410 as described herein, e.g., encrypt and encode data during a write operation, manage the dispersal of slices of data during a write operation, and decode and decrypt data during a read operation, etc. The DS processing unit program module 415 may comprise one or more program modules 42 as described with respect to FIG. 1.

According to aspects of the invention, the DS units 420 are configured to store the data slices that are received from a DS processing unit 410 during a write, and to return data slices to a DS processing unit 410 during a read. Each DS unit 420 may comprise a physical device (e.g., a computer device such as a computer system/server 12 of FIG. 1), a virtual machine (VM), or a container (e.g., a Docker container).

In embodiments, each DS unit 420 comprises DS unit program module 425 and data storage 427. The DS unit program module 425 may comprise one or more program modules 42 as described with respect to FIG. 1, and is configured to perform processes of the DS unit 420 as described herein, e.g., store data slices that are received from a DS processing unit 410 during a write, return data slices to a DS processing unit 410 during a read, perform compaction of data in the data storage 427, provide for the retention of deleted data in a zone in the data storage 427 for a given retention window, etc.

In embodiments, the data storage 427 receives and stores data in accordance with instructions received from the DS unit program module 425. The data storage 427 is one or more of any type or combination of types of data storage medium, data storage device, or system (e.g., storage device 65 of FIG. 3) and is located on (or is accessible to) the DS unit 420. For example, the data storage 427 may include one or more hard drives, Shingled Magnetic Recording (SMR) drives, solid state drives (SSDs), Tape Drives, and other memory devices.

In implementations, a client device 450 runs a client application that communicates with one of the DS processing units 410 to perform data operations in the DSN 400. In embodiments, the client application uses application programming interfaces (APIs) to perform data operations in the DSN 400. In one example, a first API call (e.g., PUT) writes a data object to the DSN 400, a second API call (e.g., GET) reads a data object from the DSN 400, a third API call (e.g., DELETE) deletes a data object from the DSN 400, and a fourth API call (e.g., LIST) lists all the data objects in a bucket in the DSN 400. In embodiments, the client device 450 comprises a computer device such as a laptop computer, desktop computer, tablet computer, etc., and may comprise one or more components of the computer system/server 12 of FIG. 1. In embodiments, the client application running on the client device 450 is a software application, and may comprise one or more program modules 42 as described with respect to FIG. 1. In embodiments, the client device 450 communicates with one of the DS processing units 410 via the network 440.

FIGS. 5-10 illustrate an exemplary operation of the DSN 400. FIG. 5 is a schematic block diagram of an example of dispersed storage error encoding of data. When a DS processing unit 410 has data to store, it disperse storage error encodes the data in accordance with a dispersed storage error encoding process based on dispersed storage error encoding parameters. Here, the computing device stores a data object, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 6 and a specific example is shown in FIG. 7); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the DS processing unit 410 divides data object into a plurality of fixed sized data segments (e.g., 1 through Y of a fixed size in range of kilobytes to terabytes or more). The number of data segments created is dependent of the size of the data and the data segmenting protocol.

The DS processing unit 410 then disperse storage error encodes a data segment using the selected encoding function (e.g., Cauchy Reed-Solomon) to produce a set of encoded data slices. FIG. 6 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 7 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 5, the computing device also creates a slice name (SN) for each encoded data slice (EDS) in the set of encoded data slices. A typical format for a slice name 480 is shown in FIG. 8. As shown, the slice name (SN) 480 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory.

As a result of encoding, the DS processing unit 410 produces a plurality of sets of encoded data slices, which are provided with their respective slice names to the storage units (DS unit 420 numbers one through five in this example) for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 9:
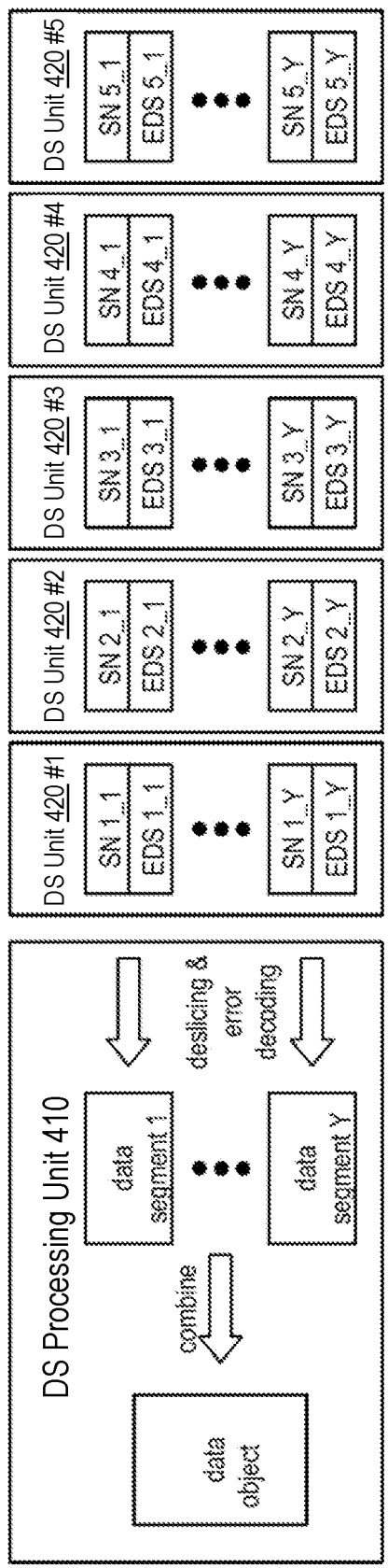
FIG. 9 is a schematic block diagram of an example of dispersed storage error decoding of data in accordance with aspects of the present invention.

FIG. 9 is a schematic block diagram of an example of dispersed storage error decoding of a data object that was dispersed storage error encoded and stored in the example of FIG. 6. In this example, the DS processing unit 410 retrieves from the storage units at least the decode threshold number of encoded data slices per data segment. As a specific example, the computing device retrieves a read threshold number of encoded data slices.

Figure 10:
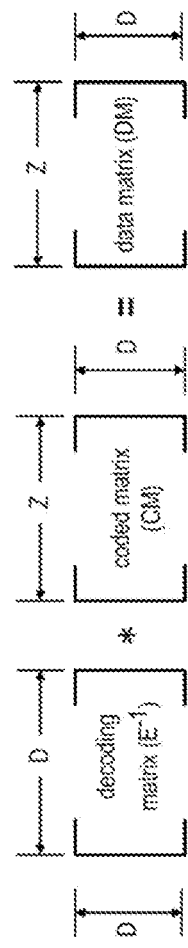
FIG. 10 is a schematic block diagram of a generic example of an error decoding function in accordance with aspects of the present invention.

To recover a data segment from a decode threshold number of encoded data slices, the computing device uses a decoding function as shown in FIG. 10. As shown, the decoding function is essentially an inverse of the encoding function of FIG. 6. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In an example of operation and implementation, memory devices (or paradigms of storage within a DSN 400 such as DS units 420 therein) may operate most efficiently in an append-only or append-heavy workload. For example, hard drives, Shingled Magnetic Recording (SMR) drives, solid state drives (SSDs), Tape Drives, and other memory devices may be implemented within a DSN 400 to store data in the form of slices as described herein. Similarly, some mechanisms for storing slices, Packed Slice Storage (PSS), and Zone Slice Storage (ZSS) are designed such that most or all new writes are done in a way that they are appended to a sequential log. Such forms of storage naturally lead to a situation where overwrites or deletes of stored slices create holes in the log. The log will continue to hold content that is no longer active data (such as old revisions of slices that have been finalized or undone, or overwritten by delete markers). To reclaim the space associated with the holes while continuing to operate in an append-only mode can require rewriting the log but skipping any entries associated with deleted or obsolesced slices.

In accordance with aspects of the invention, each DS unit 420 uses Zone Slice Storage (ZSS) to store data in its data storage 427. ZSS is a storage paradigm that is implemented by the DS unit program module 425 at each DS unit 420. In ZSS, the DS unit program module 425 defines zones of fixed size (e.g., typically 256 MB) in the storage media (e.g., data storage 427). In embodiments, the DS unit program module 425 sequentially stores slices received from DS processing units 410 in zones, with many slices from many different data objects being stored together in a respective zone. In embodiments, the DS unit program module 425 utilizes a fully sequential write protocol. For example, a storage unit (e.g., DS unit 420) can be implemented by utilizing Append Optimal Storage Devices (AOSD) or other memory devices for which appended writes are the optimal form of access, and/or for which an append-only write scheme is utilized when storing data. The append-only write scheme dictates that new data slices are written by being appended to an end, or "append point" of a zone in storage, such as storage zone. As data slices are written, they are written to the next space in their respective zone of memory according to the corresponding append point of the zone, and the append point is updated based on the length of newly written data. Append points for each zone can be maintained in a volatile memory such as RAM or other memory of the storage unit, and can be stored as a pointer or other reference to the append point location of the memory device.

The storage unit (e.g., DS unit 420) can dynamically allocate new zones and un-allocate old zones of one or more memory devices to maintain a fixed number of active zones and/or a number of active zones that is determined to be optimal. The number of zones and/or the zones selected in the subset can be determined based on zone allocation parameters and/or zone reallocation parameters, which can be based on I/O request frequency, memory and/or processing requirements, I/O speed requirements, and/or other zone allocation and/or reallocation requirements. Selecting a smaller subset of zones open for write can further minimize seeking and thus improve I/O speed. In some embodiments, exactly one zone per memory device is open for writing at any given time. This can eliminate seeking on each memory device as writing is fully sequential on each memory device. In various embodiments, the active zone can be selected based on available space in the zone, based on a previously selected zone, and/or selected randomly. The storage unit can maintain information regarding which zones are designated as open to writes and/or reads, and which zones are closed to writes and/or reads, and can change these designations in response to determining a reallocation requirement is met. The storage unit can also maintain zone priority information and/or available capacity information for each of the zones. This information can be stored in RAM or other memory of the storage unit.

Fully sequential writing and the log-based data structure employed in ZSS leads to unreferenced space in zones when, for example, a slice that is stored in a zone is subsequently revised or deleted. Such unreferenced space is referred to as holes, and ZSS uses compaction to reclaim the space occupied by holes. To reclaim space in a zone that has both holes and live data (i.e., slices that are not revised or deleted), the storage unit (e.g., DS unit 420) reads the entire zone and sequentially writes the live data in a new zone, with no holes. The live data is compacted in the new zone, and the initial zone is released for future allocation (e.g., for sequentially writing new incoming slices in the entirety of this zone). In this manner, the storage unit reclaims the unreferenced space that was occupied by the holes in the initial zone. The amount of space reclaimed depends on how much unreferenced space is in a zone. The edge compaction case is when no live data is in a zone, in which case compaction turns into I/O NOOP. This is a singular case in which compaction is virtually free. Thus it is seen that compaction efficiency is a factor that affects overall ZSS efficiency.

Figure 11:
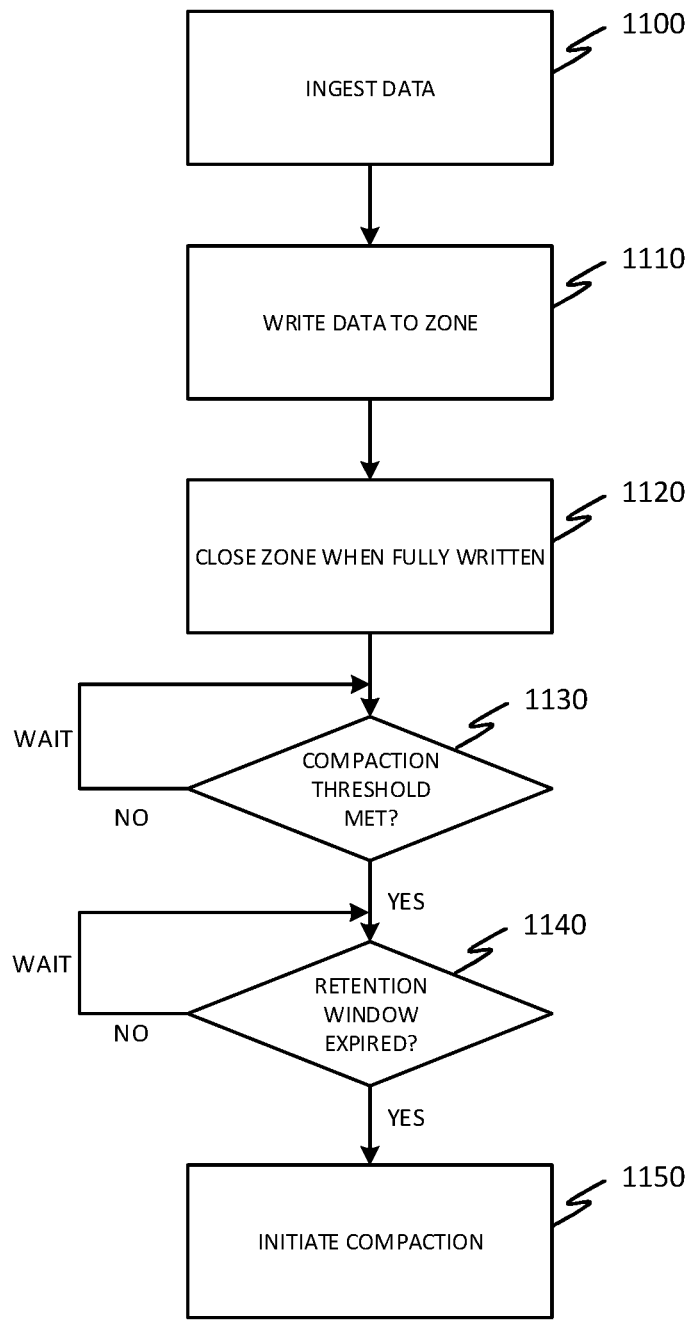
FIG. 11 depicts a flowchart of an exemplary method performed in accordance with aspects of the invention.

FIG. 11 depicts a flowchart of an exemplary method for data retention in zone storage. The method of FIG. 11 is performed by the DS unit program module 425 of the DS units 420 in accordance with aspects of the invention. In other embodiments, the DS processing unit program module 415 of the DS processing units 410 performs some or all of the steps of the method of FIG. 11, and/or the DS unit program module 425 of the DS units 420 performs some or all of the steps of the method of FIG. 11 in response to instructions received from the DS processing unit program module 415 of the DS processing units 410 and/or the DS manager 430. The steps of the method are performed in the environment of FIG. 4 and are described with reference to the elements shown in FIG. 4.

At step 1100, the DS processing unit 410 ingests data. In embodiments, the DS processing unit program module 415 of the DS processing unit 410 receives a request, from the client device 450, to store (write) a data object in the DSN. In response to receiving the request to store the data object, the DS processing unit program module 415 generates a plurality of slices from the received data object and sends, to one or more of the DS units 420, requests to store (write) one or more of the plurality of slices generated from the received data object.

Still referring to FIG. 11, at step 1110, a DS unit 420 writes the data to a zone. In embodiments, the DS unit program module 425 of the DS unit 420 receives the request from step 1100 to store (write) one or more of the plurality of slices generated from the received data object from the DS processing unit program module 415 of the DS processing unit 410 and stores (writes) the one or more of the plurality of slices to one or more zones in the data storage 427 of the DS unit 420.

Still referring to FIG. 11, at step 1120, the DS unit 420 closes the zone when fully written. In embodiments, the DS unit program module 425 of the DS unit 420 closes one or more fully written (e.g., filled) zones to writing in the data storage 427 of the DS unit 420. In embodiments, closing the zone in the data storage 427 includes releasing or deallocating resources (e.g., persistent zone resources for maintaining the zone) that are used for writing to the zone, once it is the case that no additional data will or can be written to the zone.

Still referring to FIG. 11, at step 1130, the DS unit 420 determines whether or not a compaction threshold has been met. In embodiments, the DS unit program module 425 of the DS unit 420 determines whether or not the compaction threshold has been met with respect to a particular zone in the data storage 427. In particular, holes (gaps) may be created in data stored in the data storage 427 of the DS unit 420 as data objects (e.g., objects ingested at step 1100) and slices associated therewith are deleted (or marked as deleted) and/or particular revisions (versions) of stored data objects and slices associated therewith are removed (or marked as deleted) (e.g., in response to instructions received from the client device 450).

Still referring to step 1130, in embodiments, the compaction threshold may be a predetermined threshold or a dynamically determined threshold based on a number and/or size of holes in the particular area of the data storage 427, utilization (fullness) of the data storage 427, and/or any other metrics, automatically determined parameters, or user-defined parameters. In an example, as the data storage 427 becomes more fully utilized, the compaction threshold may be lowered so that compaction is performed more frequently. In another example, the compaction threshold may be set such that compaction is triggered when a predetermined amount of space on the data storage 427 will be reclaimed. In another example, the compaction threshold may be dynamically determined based upon a system load of the DS unit 420 (i.e., if the system load is comparatively lower, compaction may be performed more frequently than if the system load is comparatively higher).

Still referring to step 1130, if the DS unit program module 425 of the DS unit 420 determines that the compaction threshold has been met, then the flow proceeds to step 1140. On the other hand, if the DS unit program module 425 of the DS unit 420 determines that the compaction threshold has not been met, then the flow returns to step 1130 (e.g., after a predetermined waiting period).

Still referring to FIG. 11, at step 1140, the DS unit 420 determines whether or not a retention window has expired. In embodiments, the DS unit program module 425 of the DS unit 420 determines that the retention window has expired if a predetermined amount of time (i.e., the retention window) has elapsed since the particular zone (from step 1130) was closed to writing at step 1120. On the other hand, if the predetermined amount of time has not elapsed since the particular zone was closed to writing at step 1120, then the DS unit program module 425 of the DS unit 420 determines that the retention window has not expired.

Still referring to step 1140, if the DS unit program module 425 of the DS unit 420 determines that the retention window has expired, then the flow proceeds to step 1150. On the other hand, if the DS unit program module 425 of the DS unit 420 determines that the retention window has not expired, then the flow returns to step 1140 (e.g., after a predetermined waiting period).

Still referring to step 1140, in other embodiments, step 1140 first includes determining the retention window based on an ingest rate of the DSN (e.g., a rate at which new data is ingested at step 1100, which may be expressed as an amount of data ingested over a period of time), and then determining whether or not the retention window has expired.

Still referring to FIG. 11, at step 1150, the DS unit 420 initiates compaction. In embodiments, the DS unit program module 425 of the DS unit 420 initiates a compaction (garbage collection) process to remove the holes in the particular zone in the data storage 427 that was determined to meet the compaction threshold at step 1130 and for which the retention window was determined to have expired at step 1140. In particular, in embodiments, the DS unit program module 425 of the DS unit 420 reads the slices stored in the particular zone and rewrites the slices to a new zone on the data storage 427, sequentially and without gaps therebetween. Accordingly, the DS unit program module 425 rewrites the slices to the new zone on the data storage 427 in a more compact manner (i.e., without gaps), eliminating holes and writing the data with 100% utilization on the new zone on the data storage 427. Additionally, in embodiments, as compaction is not performed until expiration of the retention window (as determined at step 1140), clients are able to read at specified times in the past (up to the length of the retention window) using read timestamps, and error recovery is possible. The flow then returns to step 1100.

In embodiments, a system and method are provided for data retention in a zone slice storage (ZSS) system, comprising the steps of: writing data to a zone with the ZSS until the zone is fully written; postponing data compaction on deleted data within the zone for a predetermined retention time window: and performing data compaction on the zone, after the predetermined retention time window has expired.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   ingesting, by a computing device, a plurality of data objects into a dispersed storage network (DSN);
   writing, by the computing device, the plurality of data objects to at least one zone on a storage medium in the DSN;
   determining, by the computing device, that a compaction threshold corresponding to the at least one zone on the storage medium in the DSN is met;
   determining, by the computing device, that a retention window corresponding to the at least one zone on the storage medium in the DSN has expired;
   in response to determining that the retention window has expired, the computing device compacting the at least one zone on the storage medium in the DSN, wherein the retention window is a predetermined amount of time; and
   closing, by the computing device, the at least one zone on the storage medium in the DSN prior to the determining that the compaction threshold is met,
   wherein the determining that the retention window has expired comprises determining that the predetermined amount of time has elapsed since the closing the at least one zone on the storage medium, and
   the retention window is determined based on an ingest rate of the DSN and further comprising determining the retention window based on the ingest rate of the DSN prior to determining that the retention window corresponding to the at least one zone on the storage medium in the DSN has expired.

2. The method according to claim 1, wherein the compacting the at least one zone comprises rewriting the plurality of data objects to a new zone on the storage medium.

3. The method according to claim 1, wherein the compaction threshold is based on utilization of the storage medium.

4. The method according to claim 1, further comprising lowering the compaction threshold as data storage becomes more fully utilized so that the compaction is performed more frequently.

5. The method according to claim 1, further comprising setting the compaction threshold such that the compaction is triggered based on a predetermined amount of space being reclaimed.

6. The method according to claim 1, further comprising dynamically determining the compaction threshold based on system load of a dispersed storage unit of the DSN.

7. The method according to claim 6, wherein the dispersed storage unit uses Zone Slice Storage (ZSS) to store data.

8. The method according to claim 7, wherein the dispersed storage unit dynamically allocates new zones and un-allocates old zones to maintain a fixed number of active zones.

9. The method according to claim 8, wherein the fixed number of active zones is determined based on I/O request frequency, memory and processing requirements, and I/O speed requirements.

10. A computer program product comprising:
one or more computer readable storage media, and program instructions collectively stored on the one or more computer readable storage media, the program instructions comprising:
program instructions to ingest a plurality of data objects into a dispersed storage network (DSN);
program instructions to write the plurality of data objects to at least one zone on a storage medium in the DSN;
program instructions to close the at least one zone on the storage medium in the DSN;
program instructions to determine that a retention window corresponding to the at least one zone on the storage medium in the DSN has expired; and
program instructions to, in response to determining that the retention window has expired, compact the at least one zone on the storage medium in the DSN,
wherein the retention window is a predetermined amount of time,
the determining that the retention window has expired comprises determining that the predetermined amount of time has elapsed since the closing the at least one zone on the storage medium, and
the closing the at least one zone comprises deallocating persistent zone resources that are used for writing to the at least one zone.

11. The computer program product according to claim 10, further comprising program instructions to, prior to compacting the at least one zone, determine that a compaction threshold corresponding to the at least one zone on the storage medium in the DSN is met.

12. The computer program product according to claim 10, wherein the compacting the at least one zone comprises rewriting the plurality of data objects to a new zone on the storage medium.

13. The computer program product according to claim 10, wherein the retention window is determined based on an ingest rate of the DSN.

14. The computer program product according to claim 10, wherein the compaction threshold is based on utilization of the storage medium.

15. A system comprising:
a processor, a computer readable memory, one or more computer readable storage media, and program instructions collectively stored on the one or more computer readable storage media, the program instructions executable to:
ingest a plurality of data objects into a dispersed storage network (DSN);
write the plurality of data objects to at least one zone on a storage medium in the DSN;
determine that a compaction threshold corresponding to the at least one zone on the storage medium in the DSN is met;
determine that a retention window corresponding to the at least one zone on the storage medium in the DSN has expired, wherein the retention window is a predetermined amount of time;
compact the at least one zone on the storage medium in the DSN; and
close the at least one zone on the storage medium in the DSN prior to the determining that the compaction threshold is met,
wherein the determining that the retention window has expired comprises determining that the predetermined amount of time has elapsed since the closing the at least one zone on the storage medium, and
the closing the at least one zone comprises deallocating persistent zone resources that are used for writing to the at least one zone.

16. The system according to claim 15, wherein the compacting the at least one zone comprises rewriting the plurality of data objects to a new zone on the storage medium.

17. The system according to claim 15, wherein the retention window is determined based on an ingest rate of the DSN.

* * * * *